(12) United States Patent
Sugiyama

(10) Patent No.: US 10,166,823 B2
(45) Date of Patent: Jan. 1, 2019

(54) TIRE PRESSURE MONITORING SYSTEM

(71) Applicant: Toyota Jidosha Kabushiki Kaisha, Toyota-shi, Aichi-ken (JP)

(72) Inventor: Toru Sugiyama, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/725,992

(22) Filed: Oct. 5, 2017

(65) Prior Publication Data
US 2018/0099534 A1    Apr. 12, 2018

(30) Foreign Application Priority Data

Oct. 11, 2016   (JP) .................. 2016-200143

(51) Int. Cl.
*B60C 23/00*   (2006.01)
*B60C 23/02*   (2006.01)
*B60C 23/04*   (2006.01)

(52) U.S. Cl.
CPC ...... *B60C 23/0486* (2013.01); *B60C 23/0401* (2013.01); *B60C 23/0447* (2013.01)

(58) Field of Classification Search
CPC ............ B60C 23/0486; B60C 23/0447; B60C 23/0401
USPC ....................................................... 340/442
See application file for complete search history.

(56) References Cited

U.S. PATENT DOCUMENTS

2014/0313025 A1* 10/2014 Yu ................... B60C 23/0447
                                                                   340/447
2015/0343859 A1* 12/2015 Yu ................... B60C 23/0461
                                                                   340/447
2016/0221403 A1*  8/2016 Uh ..................... B60C 23/009
2016/0272017 A1*  9/2016 Ghannam ............. B60T 7/12
2017/0326928 A1* 11/2017 Oomi .................. B60C 23/02

FOREIGN PATENT DOCUMENTS

| JP | H11351888 A  | 12/1999 |
| JP | 2003267010 A |  9/2003 |
| JP | 2004284529 A | 10/2004 |
| JP | 2009-202675 A |  9/2009 |
| JP | 2017171240 A |  9/2017 |

* cited by examiner

*Primary Examiner* — Tanmay Shah
(74) *Attorney, Agent, or Firm* — Dinsmore & Shohl LLP

(57) ABSTRACT

A tire air pressure monitoring system for a vehicle is disclosed. The tire air pressure monitoring system includes a detector configured to detect tire air pressures of tires of the vehicle; and a processing device. The processing device is configured to output a first notification that is an alarm representing a reduced tire air pressure state based on at least one of the tire air pressures less than or equal to a first threshold, detect a predetermined opportunity at which the tires can be filled with air, and output a second notification, differently from the first notification, based on a detection of the predetermined opportunity and at least one of the tire air pressures less than or equal to a second threshold but greater than the first threshold, the second threshold being greater than the first threshold.

5 Claims, 6 Drawing Sheets

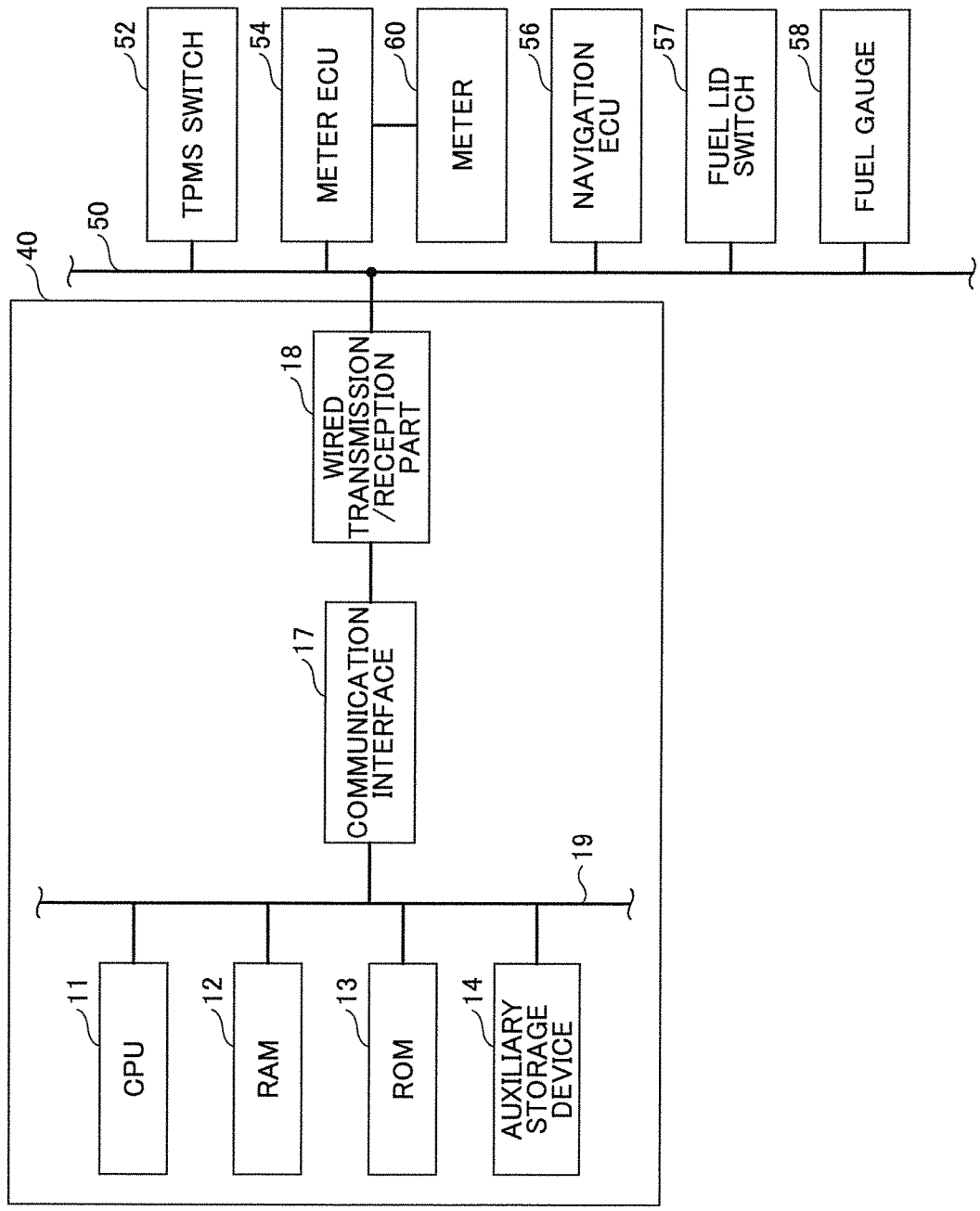

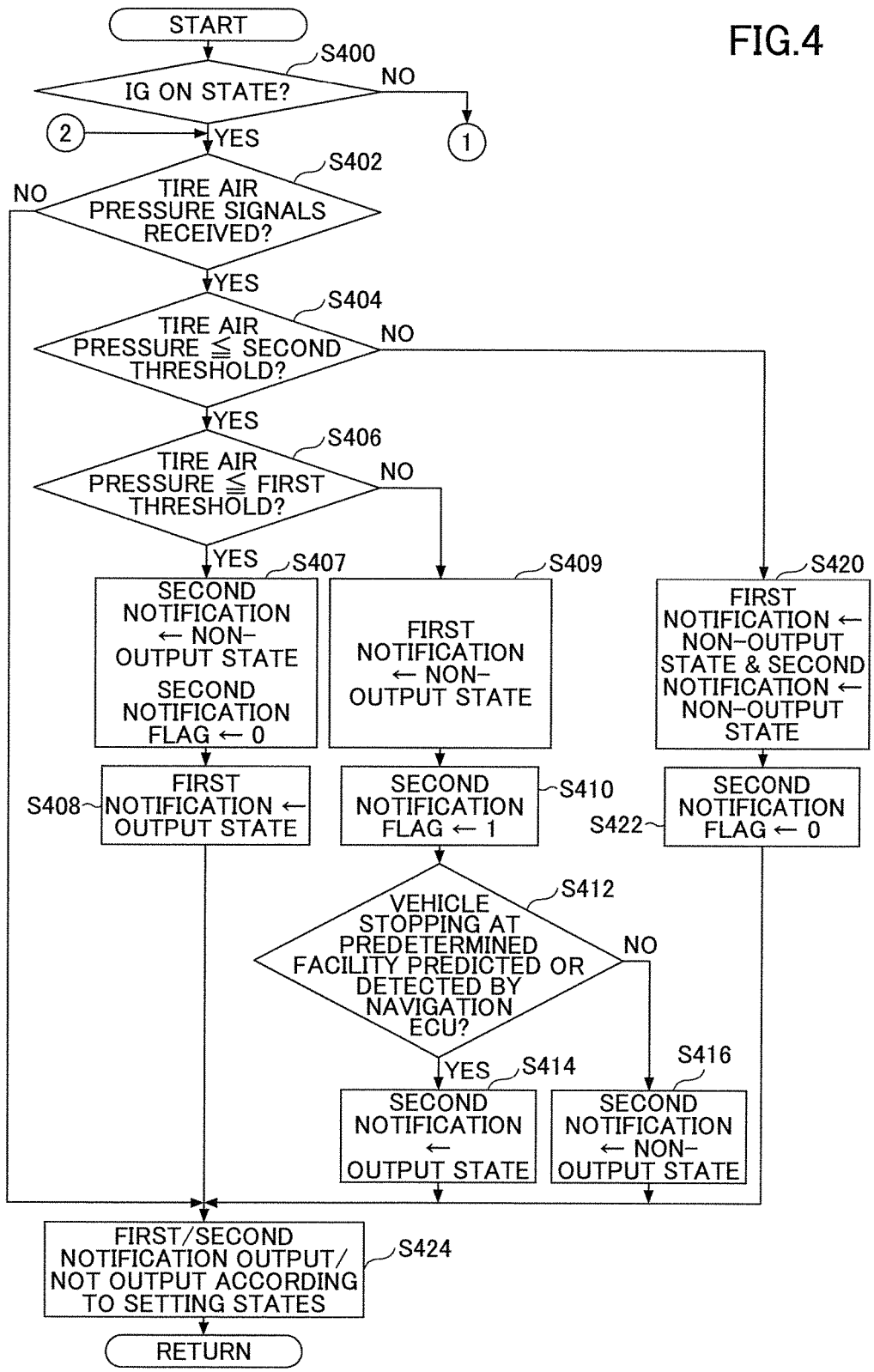

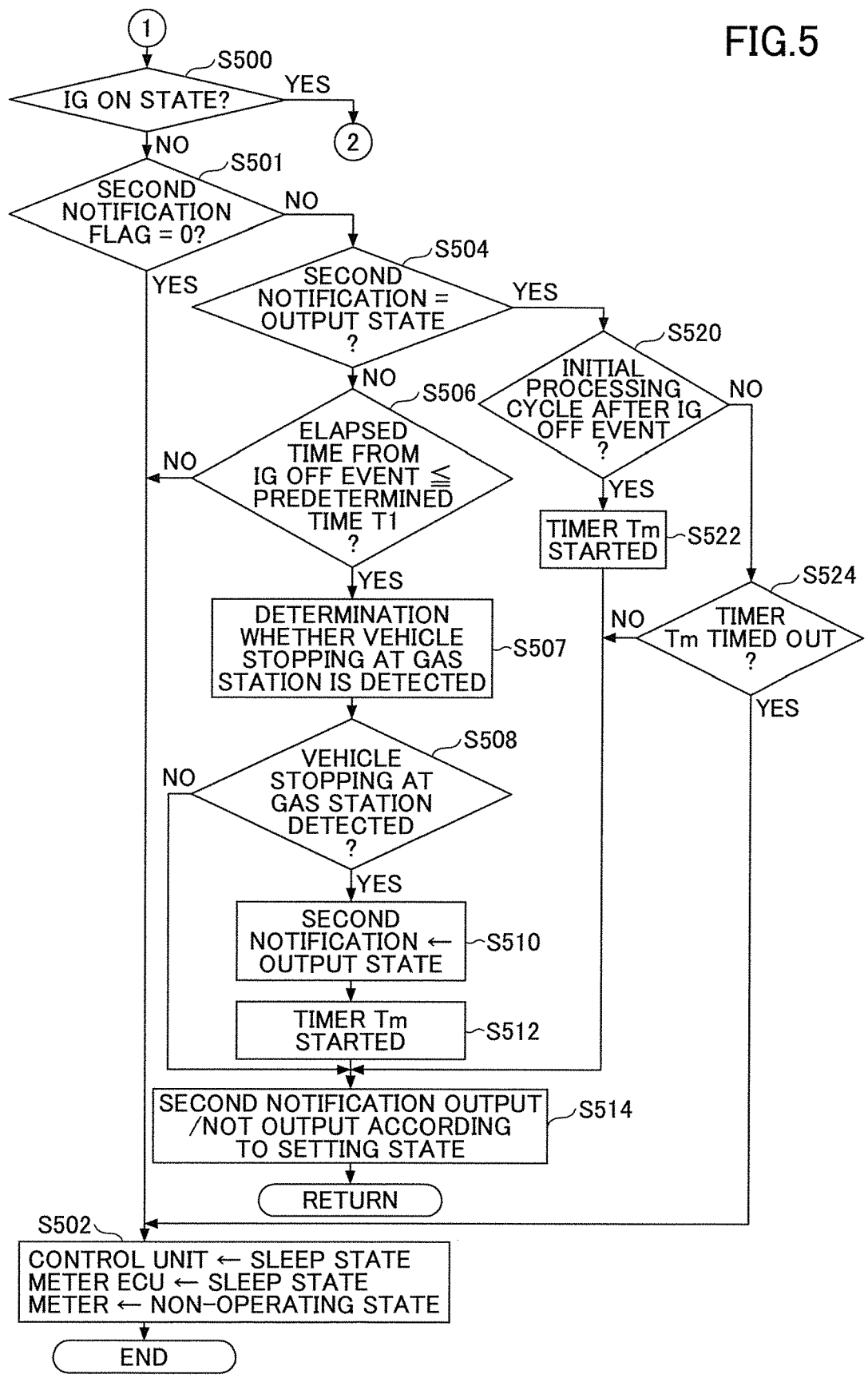

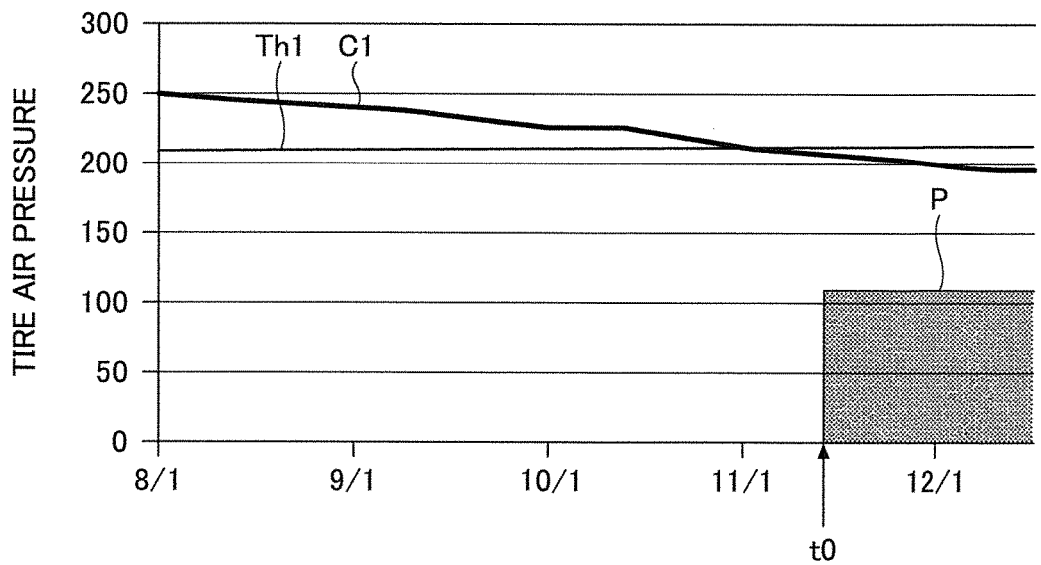
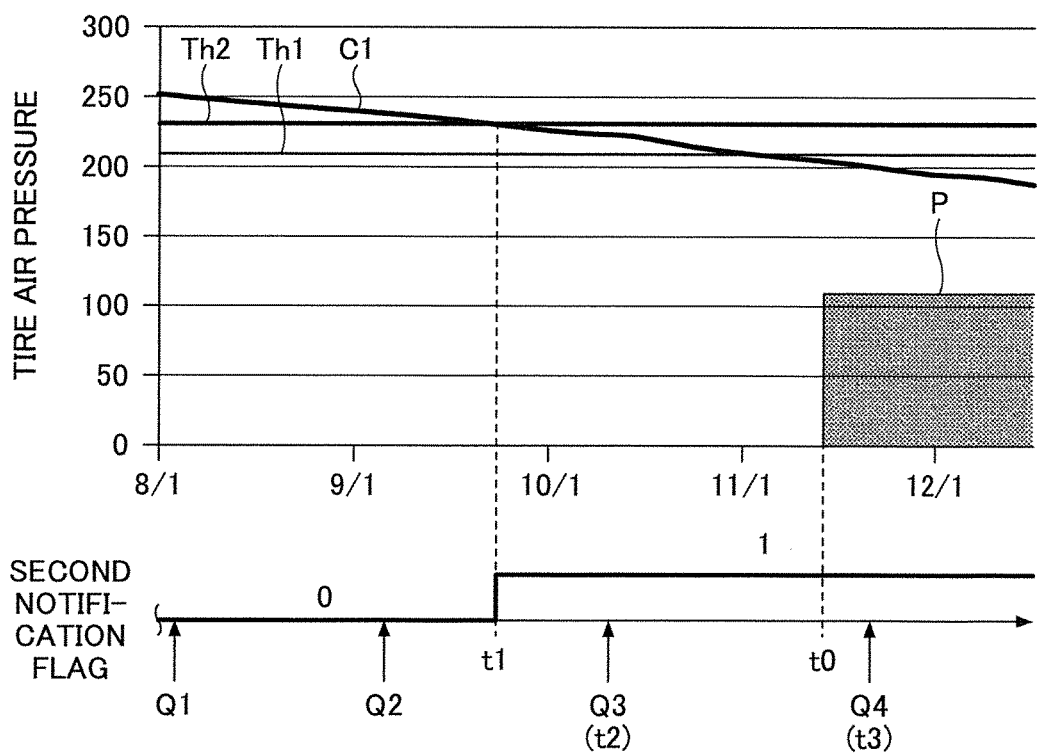

TIRE PRESSURE MONITORING SYSTEM

CROSS REFERENCE TO RELATED APPLICATION

The present application is based on and claims the benefit of priority of Japanese Priority Application No. 2016-200143, filed on Oct. 11, 2016, the entire contents of which are hereby incorporated by reference.

FIELD

The disclosure is related to a tire air pressure monitoring system.

BACKGROUND

A tire air pressure monitoring system (TPMS) for monitoring a tire air pressures of tires of a vehicle is known (for example, Japanese Laid-open Patent Publication No. 2009-202675).

However, according to the conventional TPMS as described above, various notifications regarding the tire air pressure cannot be output in a user-friendly manner. For example, when a notification indicating a reduced state of the tire air pressure is output without any previous sign, the notification becomes an unexpected alarm for a user, which causes the user to have difficulty with how to respond to it. Moreover, when the user mistakes such a notification for a puncture alarm (tire deflation warning), there is a probability that the notification unnecessarily causes anxiety to the user.

SUMMARY

According to one aspect, a tire air pressure monitoring system for a vehicle is disclosed, the tire air pressure monitoring system comprising:

a detector configured to detect tire air pressures of tires of the vehicle; and a processing device, wherein the processing device is configured to output a first notification that is an alarm representing a reduced tire air pressure state based on at least one of the tire air pressures less than or equal to a first threshold, detect a predetermined opportunity at which the tires can be filled with air, and output a second notification, differently from the first notification, based on a detection of the predetermined opportunity and at least one of the tire air pressures less than or equal to a second threshold but greater than the first threshold, the second threshold being greater than the first threshold.

BRIEF DESCRIPTION OF DRAWINGS

FIG. 2 is a diagram illustrating an example of a configuration of a control device.

FIG. 4 is a flowchart (No1) illustrating an example of a process executed by a control device.

FIG. 5 is a flowchart (No2) illustrating an example of a process executed by a control device.

FIG. 6A is a diagram illustrating the case of a comparative example.

FIG. 6B is a diagram illustrating the case of the embodiment.

DESCRIPTION OF EMBODIMENTS

In the following, embodiments are described in detail with reference to appended drawings.

Figure 1:
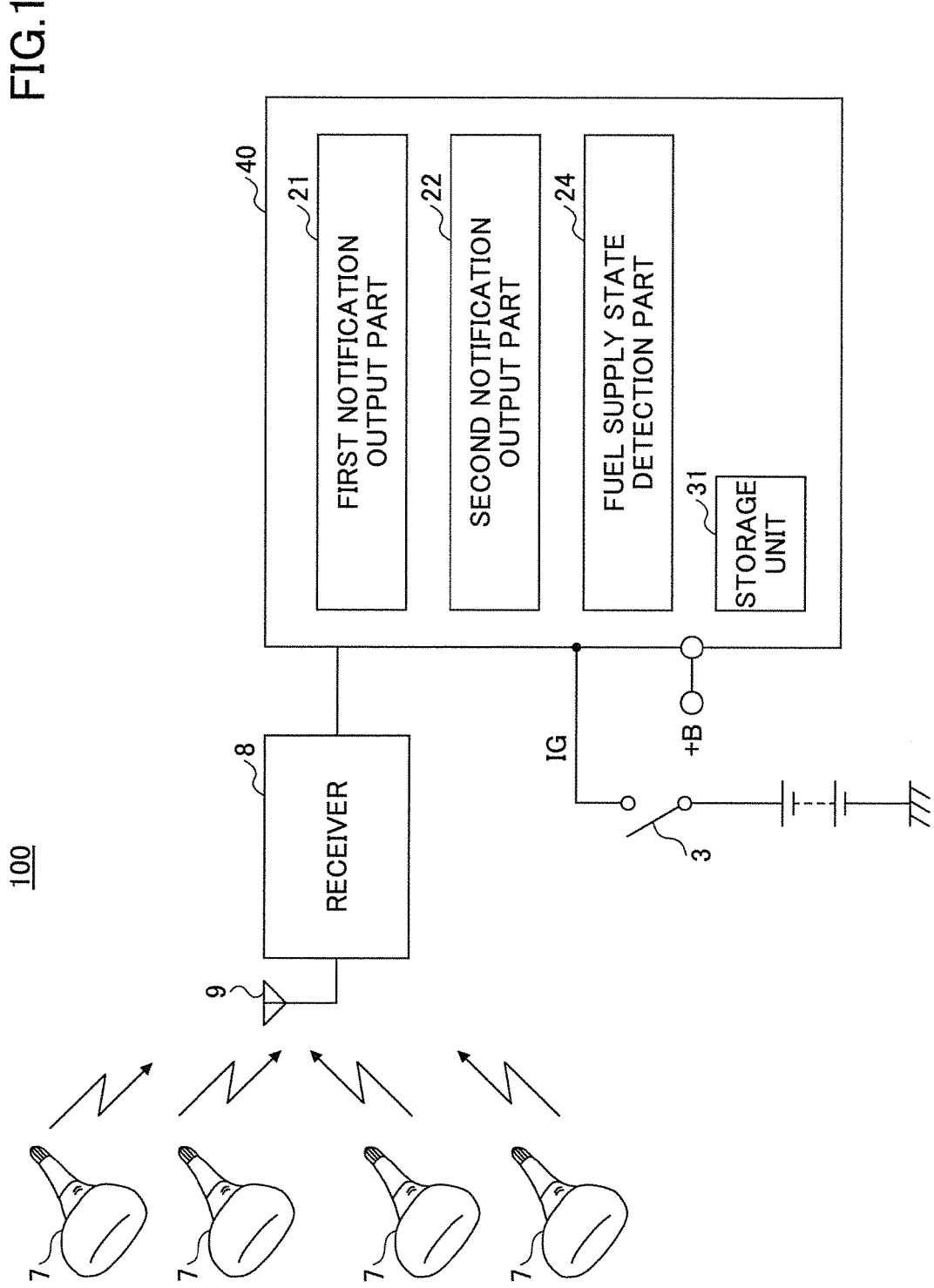
FIG. 1 is a diagram for illustrating a configuration of a TPMS according to an embodiment.

FIG. 1 is a diagram for illustrating a configuration of a TPMS according to an embodiment. TPMS 100 includes tire valve transmitters 7 (an example of a detector) and a receiver 8, a control unit 40, and a navigation ECU 56 (see FIG. 2).

The tire valve transmitter 7 is provided in each wheel of the vehicle. In the example illustrated in FIG. 1, four of the tire valve transmitter 7 are provided, corresponding to a vehicle with four wheels. The tire valve transmitter 7 is fixed to a rim portion of each wheel, for example, so as to be able to detect a tire air pressure, such that a sensing unit thereof for detecting the tire air pressure is disposed within the tire. The tire valve transmitter 7 generates a signal representing a detection result by the sensing unit, and transmits the generated signal to the receiver 8. The signal (radio signal) which the tire valve transmitter 7 transmits is received by the receiver 8. Transmission timing of the radio signal from the tire valve transmitter 7 is determined within the tire valve transmitter 7, for example. For example, the tire valve transmitter 7 transmits the radio signal relating to tire air pressure every 60 seconds. Hereinafter, a radio signal relating to the tire air pressure transmitted from the tire valve transmitter 7 is also referred to as "tire air pressure signal".

The receiver 8 receives the radio signal from the tire valve transmitter 7 via a receiving antenna 9. The receiver 8 is provided in a vehicle body.

The control unit 40 is supplied with power from a battery through an ignition switch 3, and operates based on the voltage +B applied through a power line, as illustrated in FIG. 1.

The control unit 40 includes a computer. The control unit 40 is, for example, an ECU (Electronic Control Unit). FIG. 2 is a diagram illustrating an example of a hardware resource configuration of the control unit 40. In FIG. 2, components coupled to the control unit 40 via a vehicle network 50 are illustrated together in association with the hardware configuration of the control unit 40.

The control unit 40 includes a CPU (Central Processing Unit) 11, a RAM (Random Access Memory) 12, a ROM (Read Only Memory) 13, the auxiliary storage device 14 (e.g., a non-volatile memory such as EEPROM (Electrically Erasable Programmable Read-Only Memory)), and a communication interface 17 which are coupled to a bus 19. Further, the control unit 40 includes a wired transmission/reception part 18 coupled to the communication interface 17. The wired transmission/reception part 18 includes a transmission/reception part that is capable of communicating via the vehicle network 50 such as CAN (Controller Area Network), LIN (Local Interconnect Network), etc.

The control unit 40 is coupled to a TPMS switch 52, a meter ECU 54, a navigation ECU 56, a fuel lid switch 57, a fuel gauge 58, etc., via the vehicle network 50, as illustrated in FIG. 2.

The TPMS switch 52 is a manual switch for various settings in the TPMS 100. The TPMS switch 52 is provided inside the vehicle so that the TPMS switch 52 can be operated by a user (e.g., driver).

The meter ECU 54 controls a display of a meter 60. The meter ECU 54 outputs, according to the instruction from the control unit 40, various notifications (e.g., a first notification and a second notification described later) described hereinafter to the meter 60.

The navigation ECU 56 detects an opportunity to fill one or more tires with air (hereinafter, referred to as "refill opportunity") based on vehicle position information from a GPS receiver (not illustrated) and facility information stored in advance. In this embodiment, the navigation ECU 56 predicts or detects the vehicle stopping at (stopping by or dropping in) a predetermined facility in which the tires can be filled with air, to detect the refill opportunity. Typically, the predetermined facility may be a gas station, dealerships, specialty stores related to a car, and the like. The facility information includes positional information of the predetermined facility. POI (Point Of Interest) information of map data may be utilized as facility information, for example. For example, the navigation ECU 56 predicts the vehicle stopping at the predetermined facility (referred to as "vehicle stopping at the predetermined facility") when the vehicle position is within the predetermined distance D1 (e.g., 30 m) with respect to a position of the predetermined facility, a winker lamp (turn signal light) associated with a direction towards the predetermined facility is turned on, and the brake lamps are turned on. Information of lighting state of the winker lamps and the brake lamps is acquired via the vehicle network 50. Further, the navigation ECU 56 detects the vehicle stopping at the predetermined facility when the vehicle position is within a predetermined distance D2 (for example, 20 m) with respect to the position of the predetermined facility, and a vehicle stop state is detected. Information of the vehicle stop state (e.g. vehicle speed information) is obtained via the vehicle network 50.

The fuel lid switch 57 is a switch that is turned on/off according to an open or closed state of a fuel lid (cap).

The fuel gauge 58 outputs an electric signal (hereinafter, referred to as "remaining fuel signal") corresponding to an amount of fuel in a fuel tank of the vehicle. The fuel gauge 58 electrically detects a position of a float provided in the fuel tank by a variable resistor (potentiometer), for example.

Figure 3A:
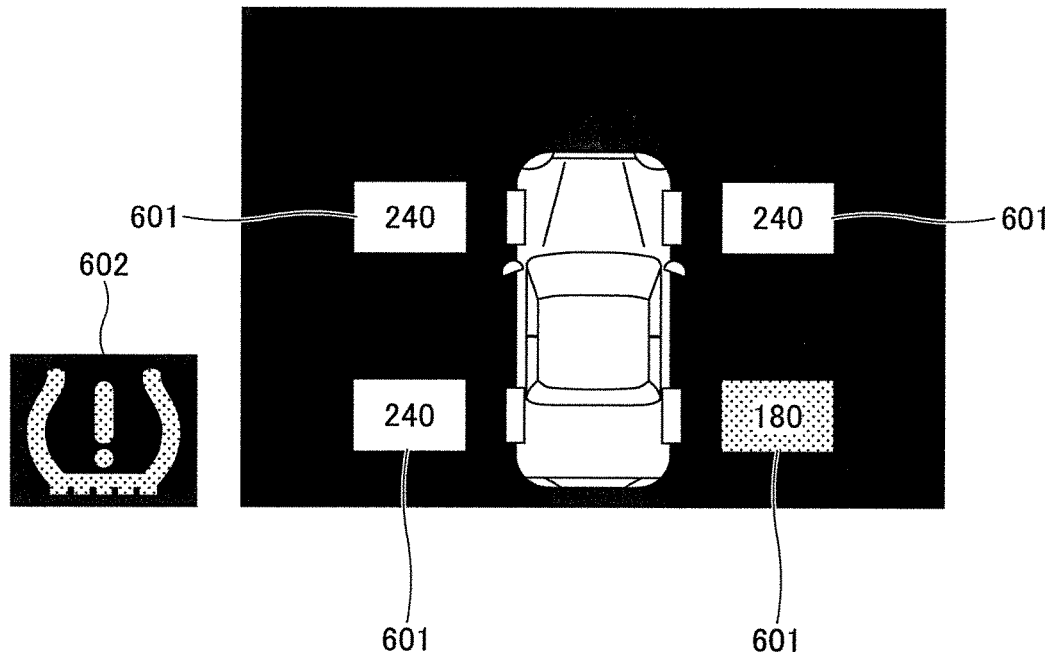
FIG. 3A is a diagram illustrating an example of an output state of a first notification on a meter.

Next, with reference to FIGS. 1 and 2 again and with reference to FIG. 3A, etc., a function of the control unit 40 is explained.

The control unit 40, as illustrated in FIG. 1, includes a first notification output part 21, a second notification output part 22, a fuel supply state detection part 24, and a storage unit 31. The first notification output part 21, the second notification output part 22, and the fuel supply state detection part 24 can be realized by the CPU 11 executing one or more programs. The storage unit 31 may be realized by the auxiliary storage device 14.

The first notification output part 21 outputs a first notification that is an alarm representing a reduced tire air pressure state based on at least one of the tire air pressures less than or equal to a first threshold. For example, the first notification output part 21 transmits a first notification output command to the vehicle network 50; also, the meter ECU 54, upon receiving the first notification output command, outputs the first notification on the meter 60 in response to the first notification output command.

The first threshold is, for example, a default set value (for example, a value based on regulations). In this embodiment, as an example, the first notification is a lowered tire air pressure warning (an alarm based on regulations, for example), and is output such that an indicator is turned on. In FIG. 3A, an example of the display on the meter 60 is illustrated. Images 601 represent detected values of the tire air pressures and are outputted at positions close to corresponding wheels of a vehicle image. In this embodiment, the first notification output part 21 changes an indicator 602, which has a shape imitating a tire with a warning mark, to a light-on state as a first notification. At this time, the image 601 according to the corresponding wheel may be highlighted. In FIG. 3A, the case where the detected value of the tire air pressure of the right rear wheel (180 MPa) is less than or equal to the first threshold (e.g., 210 MPa) is illustrated.

The second notification output part 22 outputs a predetermined second notification in a different manner from the first notification, based on a detection of the refill opportunity and at least one of the tire air pressures less than or equal to a predetermined second threshold but greater than the first threshold. The second threshold is greater than the first threshold. The detection of the refill opportunity is implemented by the fuel supply state detection part 24 or the navigation ECU 56. For example, the second notification output part 22 transmits a second notification output command to the vehicle network 50, and the meter ECU 54, upon receiving the second notification output command, outputs the second notification on the meter 60 in response to the second notification output command.

The second threshold is a default set value (a value greater than the first threshold). For example, the second threshold may be greater than the first threshold by a predetermined ratio (for example, the second threshold=1.2×first threshold). The second notification is output differently from the first notification as described above. This is because the thresholds (the second threshold and the first threshold) used are different. Outputting the second notification differently from the first notification helps the user to understand the differences between the first notification and the second notification.

Figure 3B:
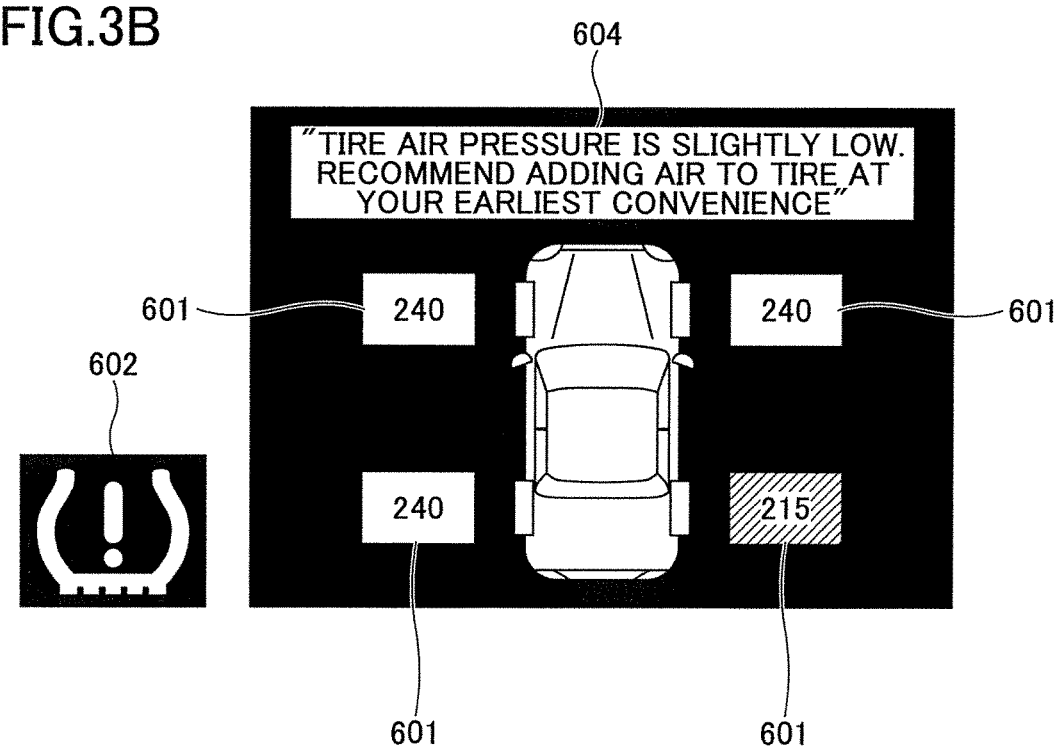
FIG. 3B is a diagram illustrating an example of an output state of a second notification on a meter.

Specifically, the second notification is output to represent an alarm degree lower than the first notification, because the second threshold is greater than the first threshold. In this embodiment, as an example, the second notification is output in a form of a message recommending adding/filling air into the tire to the user. The message related to the second notification may be output on the meter 60, may be output to another display device (not illustrated), or may be output by voice. In this embodiment, as an example, the second notification output part 22 outputs a message 604 "Tire air pressure is slightly low. Recommend adding air to tire at your earliest convenience" as a second notification. At this time, the image 601 according to the corresponding wheel may be highlighted. In FIG. 3B, the case where the detected value of the tire air pressure of the right rear wheel (215 MPa) is greater than the first threshold (e.g., 210 MPa) but less than or equal to the first threshold (e.g., 230 MPa) is illustrated. Note that, in a output state of the second notification, the indicator 602 is in an OFF state.

The fuel supply state detection part 24 detects the refill opportunity based on a fuel supply state. Specifically, the fuel supply state detection part 24 detects the refill opportunity by detecting the vehicle stopping at a gas station. In general, in a gas station, it is possible to replenish the tire air pressure.

In this embodiment, as an example, the fuel supply state detection part 24 detects the vehicle stopping at the gas station based on the opening of the fuel lid. The opening of the fuel lid can be detected based on the fuel lid switch 57. This is because a probability of fueling after the opening of the fuel lid is high and thus a probability of the vehicle stopping at the gas station is high. For example, the fuel supply state detection part 24 detects the vehicle stopping at the gas station based on an open state of the fuel lid and the OFF state of the ignition switch 3. This is because the fueling is performed in the OFF state of the ignition switch 3.

Further, in this embodiment, as an example, the fuel supply state detection part 24 further detects the vehicle stopping at the gas station based on an increase in an amount of fuel in the fuel tank of the vehicle. The increase in the amount of fuel can be detected on the basis of the remaining fuel signal from the fuel gauge 58. This is because an increase in the amount of fuel indicates a high probability of fueling and thus a high probability of the vehicle being at a gas station. For example, the fuel supply state detection part 24 detects the vehicle stopping at a gas station based on the increase in the amount of fuel and the OFF state of the ignition switch 3.

The storage unit 31 has the first threshold and the second threshold stored therein.

According to the present embodiment, various notifications regarding the tire air pressure can be output in a user-friendly manner. That is, according to this embodiment, when the tire air pressure of the vehicle decreases, a probability that the second notification is output prior to the first notification increases. Specifically, a situation is assumed such that, for a decrease in the tire air pressure of the vehicle, the tire air pressure is greater than the first threshold but equal to or less than the second threshold. In such a situation, when a refill opportunity is detected before the tire air pressure becomes equal to or less than the first threshold, the second notification can be output prior to the first notification. Accordingly, it is possible to reduce inconvenience caused by the output of the first notification without the second notification having been output in advance. Note that the inconvenience is such that, when the first notification is an unexpected alarm to the user, the user becomes troubled regarding how to respond to such a first notification, or when the user can mistake the first notification for a puncture alarm, such that there is a probability that the first notification unnecessarily causes anxiety to the user.

Further, according to the embodiment, since the second notification is output when the refill opportunity is detected, the user may utilize the refill opportunity to replenish the tire air pressure. Therefore, according to the embodiment, the second notification becomes more user-friendly as compared with a configuration in which the second notification is output independently from the detection of the refill opportunity.

Further, according to the embodiment, since the vehicle stopping at the predetermined facility is predicted or detected by the navigation ECU 56, the prediction or detection can be realized without adding a special configuration. In the same way, since the vehicle stopping at the gas station is detected on the basis of the information from the fuel lid switch 57 and the fuel gauge 58, the detection can be realized without adding a special configuration. As other detection methods (method for detecting the vehicle stopping at the gas station, etc.), an image recognizing method for features (such as a logo) of the facility such as gas stations may be used with a vehicle-mounted camera.

Next, with reference to FIG. 4 and FIG. 5, examples of an operation of the control unit 40 is described.

FIGS. 4 and 5 are schematic flow charts illustrating an example of a process executed by the control unit 40. The process illustrated in FIG. 4 is activated at an ON event of the ignition switch 3, and is repeatedly executed with a loop of a predetermined cycle ("Return" in FIG. 4 indicates the loop). The process illustrated in FIG. 5 is activated in response to a determination result "NO" in step S400 in FIG. 4, and is repeatedly executed with a loop of a predetermined cycle ("Return" in FIG. 5 indicates the loop). Note that, in the following, for the sake of the explanation, it is assumed that transmission timings of the tire air pressure signals for each of the tire valve transmitters 7 of the four wheels are synchronized.

In FIG. 4 and FIG. 5, as a premise, the meter ECU 54 is in a start-up (active) state even in the OFF state of the ignition switch 3 until a transition to a sleep state in Step S502 described hereinafter, so that the output of the second notification in the OFF state of the ignition switch 3 can be implemented. Similarly, the meter 60 is also in an operating state even in the OFF state of the ignition switch 3 until a transition to a non-operating state in Step S502 described hereinafter, so that the output of the second notification in the OFF state of the ignition switch 3 can be implemented.

In step S400, the first notification output part 21 determines whether the ignition switch 3 is in the ON state. If the determination result is "YES", the process goes to step S402, and if the determination result is "NO", the process goes to step S500 in FIG. 5.

In step S402, the first notification output part 21 determines whether the tire air pressure signals from the tire valve transmitters 7 has been received. If the determination result is "YES", the process goes to step S404, and if the determination result is "NO", the process goes to step S424.

In step S404, the first notification output part 21 determines, based on the tire air pressure signals received most recently, whether the tire air pressure is equal to or less than the second threshold. The second threshold is as described above. If the determination result is "YES", the process goes to step S406, and if the determination result is "NO", the process goes to step S420. Note that if the first notification output part 21 determines that at least one of the tire air pressures related to the four wheels is less than or equal to the second threshold, the process proceeds to step S406.

In step S406, the first notification output part 21 determines, based on the tire air pressure signals received most recently, whether the tire air pressure is equal to or less than the first threshold. The first threshold is as described above. If the determination result is "YES", the process goes to step S407, and if the determination result is "NO", the process goes to step S409. Note that if the first notification output part 21 determines that at least one of the tire air pressures related to the four wheels is less than or equal to the first threshold, the process proceeds to step S407.

In step S407, the first notification output part 21 sets the second notification to a non-output state, and resets a second notification flag to "0" (or maintains at "0"). In FIGS. 4 and 5, the setting state of the second notification is set using a second notification output state flag. The second notification output state flag is set to "1" when the second notification is set to the output state. An initial value of the second notification output state flag is "0". The second notification output state flag is stored in a volatile memory (e.g. RAM 12), and the second notification output state flag is necessarily reset to "0" in step S502 described hereinafter. Further, the second notification flag indicates the need for the second notification when the refill opportunity is detected. The second notification flag being "0" represents a state in which the second notification is not required.

In step S408, the first notification output part 21 sets the first notification to the output state. The setting state of the first notification is set by using a first notification output state flag. The first notification output state flag is set to "1" when the first notification is set to an output state. An initial value of the first notification output state flag is "0". Once the first notification output state flag has been set to "1", the first notification output state flag is maintained at "1" until the first notification is set to a non-output state (see step S409 and step S420). The first notification output state flag is maintained also at "1" in the OFF state of the ignition switch 3. For this purpose, the first notification output state flag is stored in the non-volatile memory (e.g., the auxiliary storage device 14).

In step S409, the first notification output part 21 sets the first notification to the non-output state. That is, the first notification output part sets the first notification output state flag to "0" (or maintains at "0").

In step S410, the first notification output part 21 sets the second notification output state flag to "1" (or maintains at "1"). The second notification flag being "1" represents a state in which the second notification is required.

In step S412, the first notification output part 21 determines whether the vehicle stopping at a predetermined facility is predicted or detected by the navigation ECU 56. For example, the navigation ECU 56 determines, for each predetermined period, whether the vehicle stopping at the predetermined facility is predicted or detected, and transmits a determination result to the control unit 40. The first notification output part 21 can determine, based on such a determination result, whether the vehicle stopping at the predetermined facility is predicted or detected by the navigation ECU 56. If the determination result is "YES", the process goes to step S414, and if the determination result is "NO", the process goes to step S416.

In step S414, the first notification output part 21 sets the second notification to the output state. That is, the first notification output part 21 sets the second notification output state flag to "1" (or maintains at "1").

In step S416, the first notification output part 21 sets the second notification to the non-output state. That is, the first notification output part 21 sets the second notification output state flag to "0" (or maintains at "0").

In step S420, the first notification output part 21 sets the first notification and the second notification to the non-output states. That is, the first notification output part 21 sets the first and second notification output state flags to "0" (or maintains at "0").

In step S422, the first notification output part 21 resets the second notification output state flag to "0" (or maintains at "0").

In step S424, the first notification output part 21 and the second notification output part 22 control the first notification and the second notification, depending on the state of the first notification output state flag and the second notification output state flag, respectively. Specifically, the first notification output part 21 outputs the first notification if the first notification output state flag is "1", and transitions to or maintains the non-output state of the first notification if the first notification output state flag is "0". The output method of the first notification is as described above. Similarly, the second notification output part 22 outputs the second notification if the second notification output state flag is "1", and transitions to or maintains the non-output state of the second notification if the second notification output state flag is "0". The output method of the second notification is as described above. When step S424 is completed, the process starts from step S400 again at the next processing cycle.

Referring to FIG. 5, in step S500, the first notification output part 21 determines whether the ignition switch 3 has been turned on. If the determination result is "YES", the process proceeds to step S402 after an initialization process (not illustrated). On the other hand, if the determination result is "NO", the process proceeds to step S501.

In step S501, the first notification output part 21 determines whether the second notification flag is "0". If the determination result is "YES", the process goes to step S502, and if the determination result is "NO", the process goes to step S504.

In step S502, the first notification output part 21 causes the control unit 40 to transition to the sleep state. In this case, until the process of FIG. 4 is started according to the subsequent ON event of the ignition switch 3, the control unit 40 is in the sleep state. Similarly, the meter ECU 54 and the meter 60 also transition to the sleep state and to the non-operating state, respectively. Note that, in the case of the second notification being in the output state, the output of the second notification is necessarily stopped when the meter 60 transitions to the non-operating state. Further, in the case of the first notification being in the output state, the output of the first notification is necessarily but temporarily stopped when the meter 60 transitions to the non-operating state. The first notification, unlike the second notification, becomes in the output state again at the subsequent ON event of the ignition switch 3.

In step S504, the first notification output part 21 determines whether the second notification is in the output state. If the determination result is "YES", the process goes to step S520, and if the determination result is "NO", the process goes to step S506.

In step S506, the first notification output part 21 determines whether an elapsed time from the OFF event of the ignition switch 3 is equal to or less than a predetermined time T1. The predetermined time T1 is a value adapted such that the predetermined time T1 is slightly longer than the time from OFF event of the ignition switch 3 to the start of refueling at a gas station. If the determination result is "YES", the process goes to step S507, and if the determination result is "NO", the process goes to step S502.

In step S507, the first notification output part 21 causes the fuel supply state detection part 24 to determine whether the vehicle stopping at a gas station is detected. The detection method of the vehicle stopping at a gas station is as described above.

In step S508, the first notification output part 21 determines whether the fuel supply state detection part 24 has detected the vehicle stopping at a gas station. If the determination result is "YES", the process goes to step S510, and if the determination result is "NO", the process goes to step S514.

In step S510, the first notification output part 21 sets the second notification to the output state.

In step S512, the first notification output part 21 starts a timer Tm that times out for a predetermined time T2. The predetermined time T2 corresponds to a time for which the output state of the second notification is maintained during the ON state of the ignition switch 3, and may be 60 seconds, for example.

In step S514, the second notification output part 22 controls the second notification in accordance with the state of the second notification output state flag. Specifically, the second notification output part 22 outputs the second notification if the second notification output state flag is "1", and maintains the non-output state of the second notification if the second notification output state flag is "0".

In step S520, the first notification output part 21 determines whether the present processing cycle is initial (the first) for the latest OFF event of the ignition switch 3. If the determination result is "YES", the process goes to step S522, and if the determination result is "NO", the process goes to step S524.

In step S522, the first notification output part 21 starts the timer Tm. The timer Tm is as described above.

In step S524, the first notification output part 21 determines whether the timer Tm has timed out. If the determination result is "YES", the process goes to step S502, and if the determination result is "NO", the process goes to step S514.

According to the process illustrated in FIGS. 4 and 5, under a situation where the ignition switch 3 is in the ON state, the second notification is output when the vehicle stopping at the predetermined facility is predicted or detected by the navigation ECU 56 in the state of the second notification flag being "1". Thus, since a probability of the second notification being output where the replenishment of the tire air pressure is possible increases, the notifications can be output in a user-friendly manner. Further, when the ignition switch 3 is turned off, the second notification is output when the vehicle stopping at the gas station is detected by the fuel supply state detection part 24 in the state of the second notification flag being "1". Thus, since a probability of the second notification being output where the replenishment of the tire air pressure is possible increases, the notifications can be output in a user-friendly manner.

Note that, in the process illustrated in FIGS. 4 and 5, output of the second notification is implemented in the OFF state of the ignition switch 3; however, this is not indispensable. For example, in FIG. 5, when the determination result of step S508 is "YES", a new flag (hereinafter, referred to as a "second notification output reservation flag") in the nonvolatile memory (e.g., the auxiliary storage device 14) is set to "1", and then the process proceeds to step S502. In this case, at the subsequent ON event of the ignition switch 3, if the second notification output reservation flag is "1", the second notification may be output. In such a variant, when the user turns on the ignition switch 3 in the gas station, the second notification is output. Thus, the user, prior to departure, determines whether to replenish the tire air pressure at the gas station. Note that, in the case of such a variant, the meter ECU 54 can immediately transition to the sleep state at the OFF event of the ignition switch 3.

FIGS. 6A and 6B are explanatory views of an effect of the present embodiment, where FIG. 6A illustrates the case of the comparative example, and FIG. 6B illustrates the case of the present embodiment. In FIG. 6A and the upper side of FIG. 6B, graphs of a time series C1 of the detected values of the tire air pressure over a certain period is illustrated, respectively, where a horizontal axis represents time and a vertical axis represents pressure (MPa). In the graphs, the line of the first threshold is indicated as "Th1", and the line of the second threshold is illustrated as "Th2". Further, in the graphs, the output state P of the first notification is illustrated. Further, in FIG. 6B, on the lower side of the graph, the time series of the state of the second notification flag is illustrated. Further, the detection event of a refill opportunity is indicated by arrows Q1 to Q4, together with the state of the second notification flag. The detection events Q1 to Q4 of the refill opportunity are separate, and arrows indicate start timings of the corresponding events. The graphs in FIGS. 6A and 6B, for the sake of the description, include time series extracted only during periods in which the control unit 40 is in the start-up state.

The comparative example is such that the second notification is not output and only the first notification is output. In the case of the comparative example, as illustrated in FIG. 6A, at time t0 when the detected value of the tire air pressure is equal to or less than the first threshold, a notification is output and the output notification is the first notification (i.e., the decreased tire air pressure warning), which leads to the inconvenience as described above.

In this respect, according to the present embodiment, it is possible to reduce the inconvenience caused in the comparative example as described above. Specifically, in the example illustrated in FIG. 6B, the detected value of the tire air pressure at time t1 is equal to or less than the second threshold, and the second notification flag is set to "1". Note that, strictly, after the time t1, the second notification flag is "0" before the first tire air pressure signal has been received after the activation of the control unit 40, which holds true for each activation of the control unit 40; however, since this point has essentially no influence on the description herein, it is not illustrated. Then, at time t2 before the detected value of the tire air pressure is equal to or less than the first threshold, the second notification is output based on the detection event Q3 of the refill opportunity. Thereafter, as in the comparative example, at time t0 when the detected value of the tire air pressure is equal to or less than the first threshold, the first notification is output. Thus, for example, the user can anticipate the subsequent first notification based on the second notification at time t2, and the use may not become troubled at time t0 when the first notification is output for the first time. For example, the user can stop by a gas station at time t3 (see the detection event Q4 of the refill opportunity), in response to the first notification, to replenish the tire air pressure. Further, for example, it is also possible for the user, in response to the second notification at time t2, to replenish the tire air pressure, which makes it possible to avoid the subsequent first notification.

All examples and conditional language recited herein are intended for pedagogical purposes to aid the reader in understanding the present disclosure and the concepts contributed by the inventor to furthering the art, and are to be construed as being without limitation to such specifically recited examples and conditions, nor does the organization of such examples in the specification relate to a showing of the superiority and inferiority of the present disclosure. Although the embodiment(s) of the present disclosure have been described in detail, it should be understood that the various changes, substitutions, and alterations could be made hereto without departing from the spirit and scope of the present disclosure. Further, all or part of the components of the embodiments described above can be combined.

For example, in the embodiment described above, the navigation ECU 56 and the fuel supply state detection part 24 are used to detect the refill opportunity; however, this is not indispensable. For example, the navigation ECU 56 is not required to have a function of detecting a refill opportunity. In this case, only the fuel supply state detection part 24 is used to detect a refill opportunity. Furthermore, the fuel supply state detection part 24 detects the vehicle stopping at the gas station based on two items of information (i.e., the information from the fuel lid switch 57 and the information from the fuel gauge 58) separately; however, this is not indispensable. For example, the fuel supply state detection part 24 may detect the vehicle stopping at the gas station based on only one of these two items of information. Alternatively, the fuel supply state detection part 24 may detect the vehicle stopping at the gas station based on a combination of two or more items of information. For example, the fuel supply state detection part 24 may detect the vehicle stopping at the gas station based on the opening of the fuel lid, the increase in the amount of fuel and the OFF state of the ignition switch 3.

Further, in this embodiment, the second notification is output in a form of a message to the user recommending adding air into the tire; however, this is not indispensable. For example, in one variation, in the example illustrated in FIGS. 3A and 3B, the message 604 is eliminated, and the second notification may be output such that a color of the corresponding display 601 related to the wheel is changed to a first predetermined color. In this case, the first predetermined color is different from a color of the display 601 in the normal state, and different from a color of the display 601 in the light-on state of the indicator 602. In this case, since the indicator 602 is not lighted, the user will not confuse the second notification with the lowered tire air pressure warning even without the message 604, and thus the user can understand that it is better to replenish the tire air pressure in the near future.

What is claimed is:

1. A tire air pressure monitoring system for a vehicle, the tire air pressure monitoring system comprising:
    a detector configured to detect tire air pressures of tires of the vehicle; and
    a processing device,
    wherein the processing device is configured to
    output a first notification that is an alarm representing a reduced tire air pressure state based on at least one of the tire air pressures less than or equal to a first threshold,
    detect a predetermined opportunity at which the tires can be filled with air, and
    output a second notification, differently from the first notification, based on a detection of the predetermined opportunity and at least one of the tire air pressures less than or equal to a second threshold but greater than the first threshold, the second threshold being greater than the first threshold.

2. The tire air pressure monitoring system of claim 1, wherein the processing device turns on an indicator to output the first notification, and
    the processing device outputs the second notification in a form of a message recommending air filling to a user.

3. The tire air pressure monitoring system of claim 1, wherein the processing device detects the predetermined opportunity based on position information of the vehicle and facility information.

4. The tire air pressure monitoring system of claim 1, wherein the processing device detects the predetermined opportunity based on an opening of a fuel lid.

5. The tire air pressure monitoring system of claim 1, wherein the processing device detects the predetermined opportunity based on an increase in a fuel amount in a fuel tank.

* * * * *